(12) United States Patent
Iguchi (10) Patent No.: US 11,289,272 B2
(45) Date of Patent: Mar. 29, 2022

(54) MULTILAYER CERAMIC ELECTRONIC COMPONENT

(71) Applicant: TDK CORPORATION, Tokyo (JP)

(72) Inventor: Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/285,543

(22) Filed: Feb. 26, 2019

(65) Prior Publication Data

US 2019/0304687 A1  Oct. 3, 2019

(30) Foreign Application Priority Data

Mar. 27, 2018 (JP) .............................. JP2018-060357
Mar. 27, 2018 (JP) .............................. JP2018-060385
Jan. 22, 2019 (JP) .............................. JP2019-008524

(51) Int. Cl.
*H01G 4/12* (2006.01)
*H01G 4/008* (2006.01)
*H01G 4/30* (2006.01)
*H01G 4/248* (2006.01)
*H01G 4/012* (2006.01)

(52) U.S. Cl.
CPC .......... *H01G 4/1227* (2013.01); *H01G 4/008* (2013.01); *H01G 4/012* (2013.01); *H01G 4/248* (2013.01); *H01G 4/30* (2013.01)

(58) Field of Classification Search
CPC ........... H01G 4/30; H01G 4/005; H01G 4/12; H01G 4/10; H01G 4/008; H01G 4/012; H01G 4/248; H01G 4/1227

USPC ............ 361/321.1, 321.2, 306.3, 301.4, 303, 361/321.4, 311, 312, 321.5, 322

See application file for complete search history.

(56) References Cited

U.S. PATENT DOCUMENTS

| | | | | |
|---|---|---|---|---|
| 2003/0190462 | A1* | 10/2003 | Nakamura | H01G 4/0085 428/304.4 |
| 2006/0039097 | A1* | 2/2006 | Satou | H01G 4/01 361/303 |
| 2007/0203014 | A1* | 8/2007 | Watanabe | H01G 4/30 501/136 |
| 2008/0068777 | A1* | 3/2008 | Takeoka | C04B 35/4682 361/321.4 |
| 2008/0212257 | A1* | 9/2008 | Sakamoto | H01G 4/30 361/305 |
| 2014/0063685 | A1 | 3/2014 | Lee et al. | |
| 2016/0163453 | A1* | 6/2016 | Ikeda | H01G 4/012 361/301.4 |
| 2018/0315549 | A1* | 11/2018 | Ueda | H01G 4/012 |

FOREIGN PATENT DOCUMENTS

| | | |
|---|---|---|
| CN | 101377980 A | 3/2009 |
| JP | 2014-053589 A | 3/2014 |

* cited by examiner

*Primary Examiner* — Arun Ramaswamy
(74) *Attorney, Agent, or Firm* — Oliff PLC (57) ABSTRACT

A multilayer ceramic electronic component includes a ceramic element body formed by alternately laminating dielectric layers and internal electrode layers. The dielectric layers include a main component containing barium titanate and a sub-component containing boron oxide and/or lithium oxide. The internal electrode layers include a main component of copper and/or silver. A coverage ratio of the internal electrode layers to the dielectric layers is 98% or less.

14 Claims, 2 Drawing Sheets

MULTILAYER CERAMIC ELECTRONIC COMPONENT

BACKGROUND OF THE INVENTION

The present invention relates to a multilayer ceramic electronic component such as a multilayer ceramic capacitor.

For example, as described in JP2014053589 (A), a multilayer ceramic capacitor including dielectric layers mainly made of barium titanate and internal electrode layers mainly made of nickel is normal for multilayer ceramic capacitors and is used for various applications. In the multilayer ceramic capacitors, it is conventionally considered that the larger a coverage ratio of internal electrode layers to dielectric layers is and the less electrode disconnection of internal electrode layers is, the larger capacitance is and the better performances are.

BRIEF SUMMARY OF INVENTION

However, the present inventor has found that when an electric current passes through a capacitor (particularly, a multilayer ceramic capacitor having internal electrode layers mainly made of nickel) after a short-circuit is generated by, for example, high voltage or mechanical stress, the capacitor may be feverish and thereby heat a mounting substrate.

The present invention has been achieved under such circumstances. It is an object of the invention to provide a multilayer ceramic electronic component, such as a multilayer ceramic capacitor, capable of maintaining insulation properties even if an electric current passes through a capacitor after a short-circuit is generated by, for example, high voltage or mechanical stress.

To achieve the above-described object, a multilayer ceramic electronic component according to a first aspect of the present invention includes a ceramic element body formed by alternately laminating dielectric layers and internal electrode layers, wherein the dielectric layers include a main component containing barium titanate and a sub-component containing boron oxide and/or lithium oxide, the internal electrode layers include a main component of copper and/or silver, and a coverage ratio of the internal electrode layers to the dielectric layers is 98% or less.

In the multilayer ceramic electronic component according to the first aspect of the present invention, the internal electrode layers include a main component of copper and/or silver, the dielectric layers include a main component containing barium titanate and a sub-component containing boron oxide and/or lithium oxide, and a coverage ratio of the internal electrode layers to the dielectric layers is 98% or less.

Since such conditions are satisfied, the multilayer ceramic electronic component according to the first aspect of the present invention can restore insulation properties by passing an electric current through the electronic component after a short-circuit is generated by, for example, high voltage or mechanical stress. Thus, insulation is secured even if an electric current passes through the short-circuited electronic component once again, and the multilayer ceramic electronic component according to the first aspect of the present invention is thereby unlikely to be feverish.

Incidentally, the following reason is conceivable for why insulation is recovered by flowing an electric current once again through the short-circuited multilayer ceramic capacitor. That is, insulation is conceivably recovered in such a manner that when the above-mentioned conditions are satisfied, an electric current flows once again through a portion where the internal electrode layers are short-circuited, and the internal electrodes are thereby melted and scattered.

Preferably, the coverage ratio of the internal electrode layers is 60% or more and 90% or less. In this structure, insulation is easily recovered after short-circuit, and initial capacitance (capacitance before short-circuit) is large.

Preferably, the coverage ratio of the internal electrode layers at outermost layers in a lamination direction of the internal electrode layers is smaller than that at a central portion in the lamination direction. When the internal electrode layers at the outermost layers in the lamination direction have a small coverage ratio, insulation is easily restored on the site. In the internal electrode layers at the central portion in the lamination direction, initial capacitance can be large by a comparatively large coverage ratio.

To achieve the above-described object, a multilayer ceramic electronic component according to a second aspect of the present invention includes a ceramic element body formed by alternately laminating dielectric layers and internal electrode layers, wherein the dielectric layers include a main component containing barium titanate and a sub-component containing boron oxide and/or lithium oxide, the internal electrode layers include a main component of copper and/or silver, and the internal electrode layers include an electrode-present area, containing conductive particles forming the internal electrode layers, and two or more electrode-absent areas, failing to contain the conductive particles, arranged alternately in a predetermined length along a longitudinal direction of the internal electrode layers.

In the multilayer ceramic electronic component according to the second aspect of the present invention, the internal electrode layers include a main component of copper and/or silver, the dielectric layers include a main component containing barium titanate and a sub-component containing boron oxide and/or lithium oxide, and the internal electrode layers include an electrode-present area, continuously containing conductive particles forming the internal electrode layers, and two or more electrode-absent areas, failing to contain the conductive particles, arranged alternately in a predetermined length along a longitudinal direction of the internal electrode layers.

Since such conditions are satisfied, the multilayer ceramic electronic component according to the second aspect of the present invention can restore insulation properties (self-repairing properties) by passing an electric current through the electronic component after a short-circuit is generated by, for example, high voltage or mechanical stress. Thus, insulation is secured even if an electric current passes through the short-circuited electronic component once again, and the multilayer ceramic electronic component according to the second aspect of the present invention is thereby unlikely to be feverish.

Incidentally, the following reason is conceivable for why insulation is recovered by flowing an electric current once again through the short-circuited multilayer ceramic capacitor. That is, insulation is conceivably recovered in such a manner that when the above-mentioned conditions are satisfied, an electric current flows once again through a portion where the internal electrode layers are short-circuited, and the internal electrodes are thereby melted and scattered.

Preferably, the predetermined length is 50 µm. When two or more electrode-absent areas exist in the predetermined length, self-repairing properties are improved.

Preferably, the internal electrode layers contain two to ten (more preferably, two to five) electrode-absent areas in the predetermined length along the longitudinal direction. In this structure, initial capacitance (capacitance before short-circuit) is improved, and self-repairing properties are also improved.

Preferably, the number of electrode-absent areas in the internal electrode layers at outermost layers in a lamination direction of the internal electrode layers in the predetermined length along the longitudinal direction is larger than that at a central portion in the lamination direction in the predetermined length along the longitudinal direction. Compared to the central portion in the lamination direction, the internal electrode layers are easily short-circuited at the outermost layers in the lamination direction. Thus, insulation can easily be recovered at the outermost layers in the lamination direction by increasing the number of electrode-absent areas in the internal electrode layers on the site. In the internal electrode layers at the central portion in the lamination direction, initial capacitance can be increased by comparatively reducing the number of electrode-absent areas.

In the first and second aspects of the present invention, the internal electrode layers preferably contain dielectric particles whose main component is barium titanate. In this structure, insulation properties are easily recovered after the short-circuit.

In the first and second aspects of the present invention, the internal electrode layers preferably contain voids. In this structure, insulation properties are easily recovered after the short-circuit.

In the first and second aspects of the present invention, an area ratio of the voids contained in the internal electrode layers at outermost layers in a lamination direction of the internal electrode layers is preferably larger than that at a central portion in the lamination direction. In this structure, insulation properties are easily recovered after the short-circuit. This is probably because heat is not easily dispersed outward from the element body if the voids contained in the internal electrode layers at the outermost layers in the lamination direction have a large area ratio.

DETAILED DESCRIPTION OF INVENTION

The present invention is described below with reference to an embodiment illustrated in the figures.

Overall Configuration of Multilayer Ceramic Capacitor

An overall configuration of a multilayer ceramic capacitor is described as an embodiment of a multilayer ceramic electronic component of the present invention.

Figure 1:
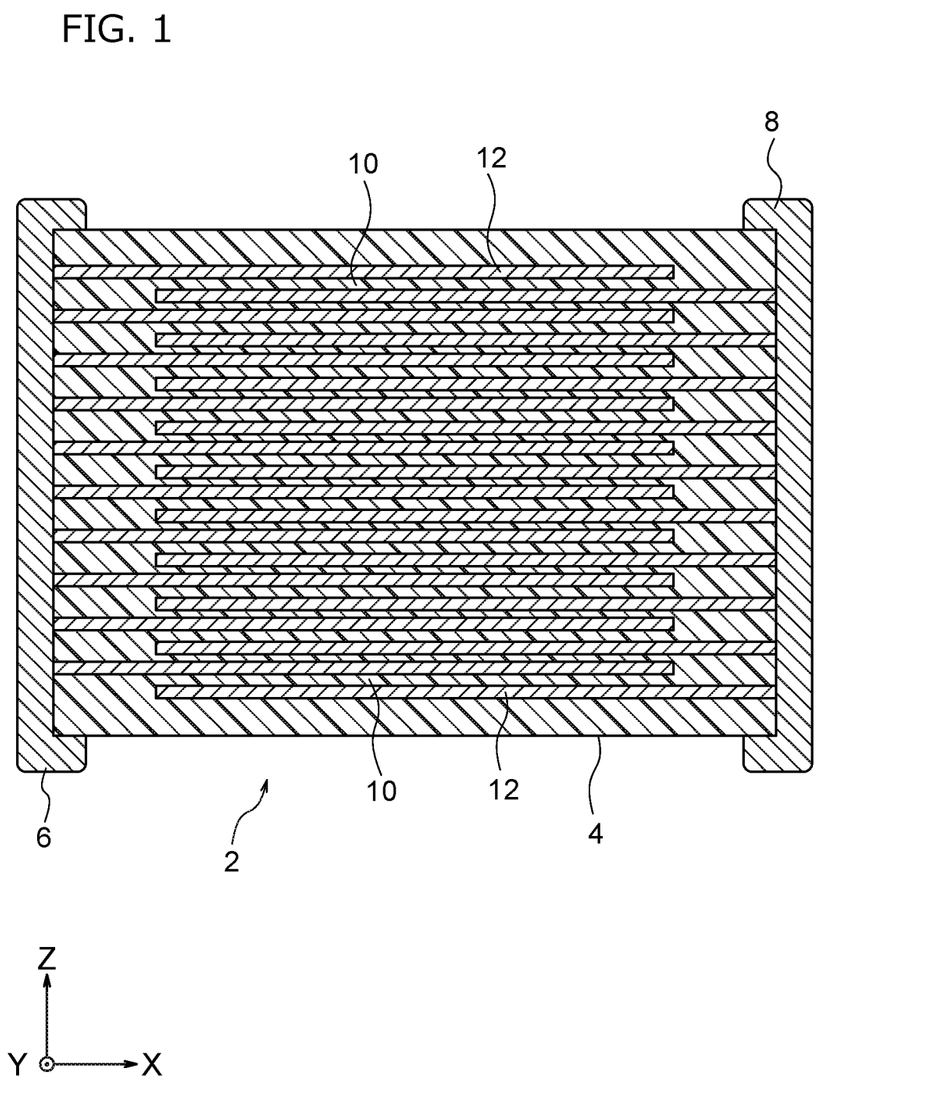
FIG. 1 is a schematic cross-sectional view of a multilayer ceramic capacitor according to an embodiment of the present invention.

As shown in FIG. 1, a multilayer ceramic capacitor 2 according to the embodiment includes a capacitor element body 4, a first terminal electrode 6, and a second terminal electrode 8. The capacitor element body 4 includes inner dielectric layers 10 and internal electrode layers 12, and the internal electrode layers 12 are laminated alternately between the inner dielectric layers 10.

A portion where the inner dielectric layers 10 and the internal electrode layers 12 are laminated alternately corresponds to an interior region (capacity region). The capacitor element body 4 includes exterior regions on both end surfaces in a lamination direction Z (Z-axis) thereof. The exterior regions are made of dielectric layers that are thicker than the inner dielectric layers 10 constituting the interior region.

The internal electrode layers 12 alternately laminated on one side are electrically connected to the inner side of the first terminal electrode 6 formed outside a first end portion of the capacitor element body 4 in the X-axis direction. The internal electrode layers 12 alternately laminated on the other side are electrically connected to the inner side of the second terminal electrode 8 formed outside a second end portion of the capacitor element body 4 in the X-axis direction.

The inner dielectric layers 10 and the exterior regions may be made of the same dielectric material or different dielectric materials, and are made of, for example, a perovskite-type dielectric material of $ABO_3$, where A is at least one of Ba, Ca, Sr, etc., and B is at least one of Ti, Zr, etc. A molar ratio of A/B is not limited and is 0.980 to 1.200.

Particularly preferably, the inner dielectric layers 10 include a main component containing barium titanate (Ba-$TiO_3$) and a sub-component containing boron oxide and/or lithium oxide. An example of boron oxide is $B_2O_3$. An example of lithium oxide is $Li_2O$.

Barium titanate (main component) is represented by, for example, a composition formula of $Ba_mTiO_{2+m}$. In the composition formula, m satisfies $0.995 \leq m \leq 1.100$, and a ratio of Ba to Ti satisfies $0.995 \leq Ba/Ti \leq 1.100$.

2.5 to 20 mol of boron oxide (sub-component) to 100 mol of barium titanate (main component) is preferably contained in the dielectric layers 10 in terms of $B_2O_3$. Alternatively, 2.5 to 20 mol of lithium oxide (sub-component) to 100 mol of barium titanate (main component) is preferably contained in the dielectric layers 10 in terms of $Li_2O$.

For example, other sub-components that may be contained in the dielectric layers 10 are at least one of MgO, CaO, SrO, and BaO, at least one of $SiO_2$ and $Al_2O_3$, at least one of MnO, $Cr_2O_3$, and $V_2O_5$, at least one of R oxide ($R_2O_3$)(Y, La, Ce, Pr, Nd, Sm, Eu, Gd, Tb, Dy, Ho, Er, Tm, Yb, and Lu), or the like. For example, these other sub-components of 0 to 10 mol (preferably, 1 to 5 mol) may be contained to barium titanate of 100 mol.

The internal electrode layers 12 contain a main component of copper (Cu) and/or silver (Ag). Containing a main component of copper (Cu) and/or silver (Ag) means that an alloy containing these metals may be contained as a main component. Moreover, containing a main component means that a proportion of copper, silver, or a copper-silver alloy contained in the internal electrode layers 12 is 80 wt % or more. The internal electrode layers 12 may contain elements other than copper, silver, or the copper-silver alloy.

The alloy containing copper (Cu) and/or silver (Ag) may be any alloy, such as Ag—Pd alloy.

The terminal electrodes 6 and 8 are made of any materials, but may normally be made of at least one of Ni, Pd, Ag, Au, Cu, Pt, Rh, Ru, Ir, etc., or an alloy of these elements. The terminal electrodes 6 and 8 are normally made of Cu, Cu alloy, Ni, Ni alloy, Ag, Pd, Ag—Pd alloy, Ag—Pd—Cu alloy, or the like. Each of the terminal electrodes 6 and 8 may be composed of multilayer electrodes.

For example, each of the terminal electrodes 6 and 8 may include a three-layer structure of a copper paste baked electrode film, a nickel plated film, and a zinc plated film or a two-layer structure of a copper paste baked electrode film and a baked electrode film containing a main component of silver, from the inner side in contact with the element body 4. Alternatively, each of the terminal electrodes 6 and 8 may include a resin electrode film made of a resin and metal particles.

The shape and the size of the multilayer ceramic capacitor 2 are determined as appropriate according to the object and the application. When the multilayer ceramic capacitor 2 has a cuboid shape, the length in the X-axis direction is normally 0.4 mm to 5.7 mm, but the length in the X-axis direction is preferably 1.0 mm to 4.5 mm in the present embodiment.

The height (length in the Z-axis direction) of the multilayer ceramic capacitor 2 varies depending on the number of laminated layers in the inner dielectric layers 10 and the internal electrode layers 12 and is normally 0.2 mm to 3.2 mm, but is preferably 0.5 to 2.5 mm in the present embodiment. The multilayer ceramic capacitor 2 normally has a length of 0.2 mm to 5.0 mm in the Y-axis direction, but preferably has a length of 0.5 mm to 2.5 mm in the Y-axis direction in the present embodiment.

In FIG. 1, the thickness of the terminal electrodes 6 and 8 is illustrated to be thicker than the actual thickness for the sake of simple illustration, but the actual thickness of the terminal electrodes 6 and 8 is respectively on the order of 10 μm to 50 μm, which is extremely thinner than the length in the X-axis direction. In the figures, the X-axis, the Y-axis, and the Z-axis are perpendicular to each other, the Z-axis corresponds to the lamination direction of the inner dielectric layers 10 and the internal electrode layers 12, and the X-axis direction corresponds to a direction where the terminal electrodes 6 and 8 face each other.

The thickness of each of the inner dielectric layers 10 is normally several μm to several tens of μm, but is preferably 0.5 μm to 20 μm in the present embodiment. The thickness of the internal electrode layers 12 is preferably 0.7 μm to 3 μm.

Figure 2:
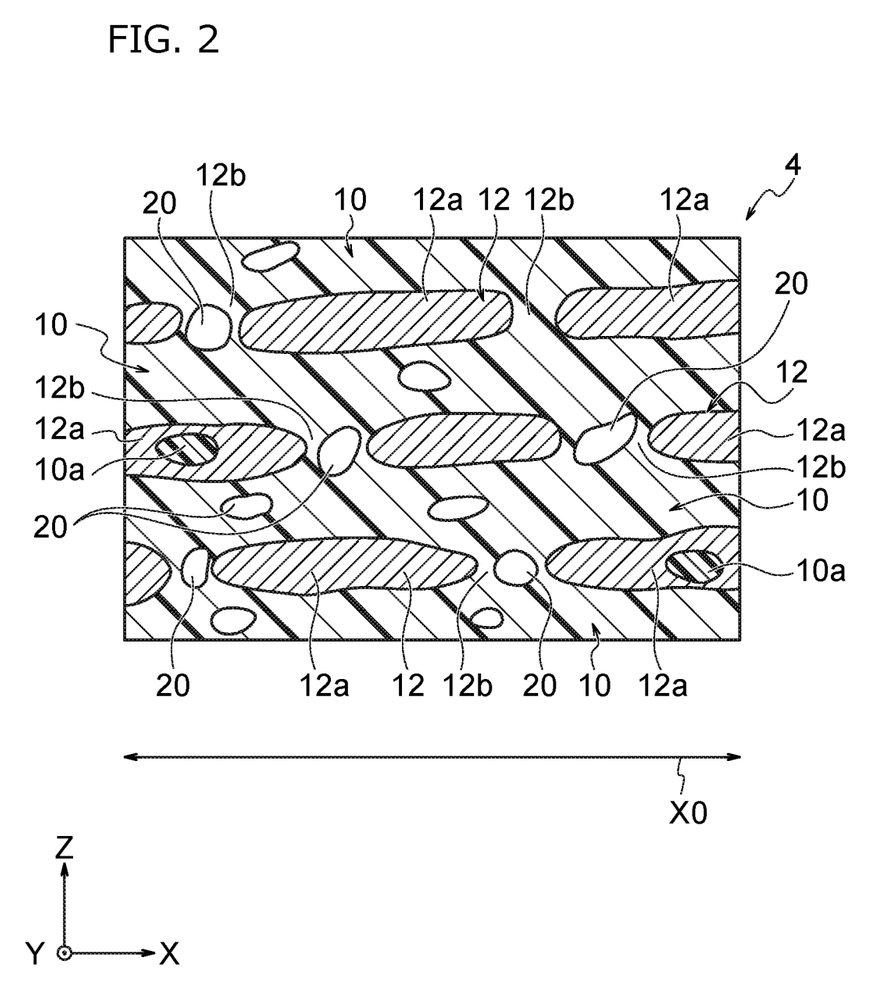
FIG. 2 is a schematic view of an enlarged cross-sectional photograph of a multilayer structure of internal electrode layers and dielectric layers in the capacitor shown in FIG. 1.

In the present embodiment, when a picture of a cross section (a cross section parallel to the Z-axis) of the capacitor 2 shown in FIG. 1 is taken as shown in FIG. 2, the following characteristics appear on the cross section of the internal electrode layers 12 within an imaging range of (10 to 50 μm)×(10 to 50) μm, for example. That is, each of the internal electrode layers 12 does not continue over the entire plane of the X-axis and the Y-axis in the cross section, but includes electrode-present areas 12a appearing intermittently via a plurality of electrode-absent areas 12b. In the electrode-present areas 12a, conductive particles constituting the internal electrode layers 12 continue in a plane direction of the X-axis and the Y-axis.

In the present embodiment, when the element body 4 is cut in a direction substantially perpendicular to the internal electrode layers 12 so as to observe a cut surface, the electrode-present areas 12a and the electrode-absent areas 12b are arranged alternately in a predetermined length X0 along a longitudinal direction, and at least two of the electrode-absent areas 12b are provided, in the internal electrode layers 12. The predetermined length X0 is not limited, but is preferably within 50 μm.

In the cut surface, the electrode-absent areas 12b appear intermittently in the longitudinal direction of the internal electrode layers 12 and do not contain the conductive particles. The electrode-absent area 12b includes an area where adjacent dielectric layers are connected by dielectric particles constituting the dielectric layers 10 and an area where voids 20 (neither the dielectric particles nor the conductive particles exist) exist. Incidentally, the voids 20 also exist in the dielectric layers 10. The internal electrode layers 12 may contain dielectric particles 10a.

In each of the internal electrode layers 12, the electrode-absent areas 12b are not formed continuously in the X-axis direction, the Y-axis direction, or in a plane direction therebetween, but appear like islands in a plane (X-Y axes plane) of each of the internal electrode layers 12. Thus, the electrode-present areas 12a of each of the internal electrode layers 12 are connected in any transverse cross section (cut surface) and are continuous in the X-axis direction and the Y-axis direction as a whole as shown in FIG. 1. A width of each of the electrode-absent areas 12b in the X-axis direction or in the Y-axis direction (or a width in the intermediate direction between the X-axis and the Y-axis) is about 1 to 10 times larger than a thickness of each of the internal electrode layers 12.

In the present embodiment, the internal electrode layers 12 do not cover dielectric layers 10 arranged therebetween by a coverage ratio of 100%, but cover them by a coverage ratio of 98% or less (preferably, 60 to 90%), in the lamination direction due to a plurality of electrode-absent areas 12b. Incidentally, a coverage ratio of the internal electrode layer 12 is calculated as a value (represented by %) obtained by dividing a total length of electrode-present areas 12a (excluding electrode-absent areas 12b) on a cross section of the internal electrode layer 12 by a length of an ideally continuous electrode.

The present inventor has earnestly studied electronic components, such as multilayer ceramic capacitor 2, and consequently found that an electronic component having excellent insulation restoration properties can be obtained by satisfying the following conditions. Then, the present invention has been accomplished.

That is, the internal electrode layers 12 of the present embodiment include a main component of copper or silver. The dielectric layers 10 include a main component containing barium titanate and a sub-component containing boron oxide and/or lithium oxide. Moreover, the internal electrode layers 12 have a coverage ratio of 98% or less to the dielectric layers 10.

Alternatively, the multilayer ceramic capacitor 2 of the present embodiment satisfies the following conditions. The internal electrode layers 12 of the present embodiment include a main component of copper or silver. The dielectric layers 10 include a main component containing barium titanate and a sub-component containing boron oxide and/or lithium oxide. Moreover, in the dielectric layers 10, the electrode-present areas 12a and the electrode-absent areas 12b are arranged alternately, and at least two of the electrode-absent areas 12b are provided, in a predetermined length X0 along the longitudinal direction.

Since such conditions are satisfied, the multilayer ceramic electronic component 2 according to the present embodiment can restore insulation properties by passing an electric current (by rated voltage) between the terminal electrodes 6 and 8 of the multilayer ceramic capacitor 2 after a short-circuit is generated by, for example, high voltage or mechanical stress. Thus, even if an electric current passes through the short-circuited multilayer ceramic capacitor 2 once again, insulation is secured, no electric current flows, and the multilayer ceramic capacitor 2 is unlikely to be feverish.

Incidentally, the following reason is conceivable for why insulation is recovered by flowing an electric current once again through the short-circuited multilayer ceramic capacitor 2. That is, insulation is conceivably recovered in such a manner that when the above-mentioned conditions are satisfied, an electric current flows once again through a portion where the internal electrode layers 12 are short-circuited, and the internal electrode layers 12 are thereby melted and scattered. Any voltage is selected for a high voltage that causes the short-circuit, but this high voltage is 2.5 times or higher than a rated voltage (10V to 630V) of the multilayer ceramic capacitor 2.

In the present embodiment, the internal electrode layers 12 preferably have a coverage ratio of 60% or more and 90% or less. In this structure, insulation is easily recovered after short-circuit, and initial capacitance (capacitance before short-circuit) is large.

In the present embodiment, the internal electrode layers 12 at the outermost layers in the lamination direction (Z-axis direction) shown in FIG. 1 have a small coverage ratio compared to that of the internal electrode layers 12 at the central portion in the lamination direction. For example, Ce/Cc is preferably smaller than 1 (more preferably, 0.8 to 0.98), where Ce is a coverage ratio at the outermost layers in the lamination direction, and Cc is a coverage ratio at the central portion in the lamination direction.

Compared to the central portion in the lamination direction, the internal electrode layers 12 are short-circuited easily in the outermost layers in the lamination direction. When the internal electrode layers 12 at the outermost layers in the lamination direction have a small coverage ratio, insulation is easily restored on the site. In the internal electrode layers 12 at the central portion in the lamination direction, initial capacitance can be large by a comparatively large coverage ratio.

Alternatively, in the present embodiment, two to ten electrode-absent areas 12b preferably exist (more preferably, two to five electrode-absent areas 12b) in each of the internal electrode layers 12 within a predetermined length X0 in the longitudinal direction. In this structure, insulation is easily recovered after short-circuit, and initial capacitance (capacitance before short-circuit) is large.

In the present embodiment, the number of electrode-absent areas 12b in the predetermined length X0 in the longitudinal direction (the X-axis direction, the Y-axis direction, or the intermediate direction therebetween) of the internal electrode layers 12 at the outermost layers in the lamination direction (Z-axis direction) is larger than that of the internal electrode layers 12 at the central portion in the lamination direction shown in FIG. 1. For example, Ec/Ee is preferably smaller than 1 (more preferably, 0.2 to 0.8), where Ec is the number of electrode-absent areas at the central portion of the lamination direction, and Ee is the number of electrode-absent areas at the outermost layers in the lamination direction.

Compared to the central portion in the lamination direction, the internal electrode layers 12 are easily short-circuited at the outermost layers in the lamination direction. Thus, insulation can easily be recovered at the outermost layers in the lamination direction by increasing the number of electrode-absent areas in the internal electrode layers 12 on the site. In the internal electrode layers 12 at the central portion in the lamination direction, initial capacitance can be increased by comparatively reducing the number of electrode-absent areas.

In the present embodiment, the electrode-present areas 12a of the internal electrode layers 12 contain the dielectric particles 10a containing a main component of barium titanate as shown in FIG. 2. In this structure, insulation properties are easily recovered after the short-circuit.

In the present embodiment, the electrode-absent areas 12b of the internal electrode layers 12 contain the voids 20. In this structure, insulation properties are easily recovered after the short-circuit. In the present embodiment, the voids 20 are also contained in the dielectric layers 10. The voids 20 have any size, but preferably have a cross-section-converted diameter of 0.2 μm to 3 μm. Incidentally, the cross-section-converted diameter is a diameter of a circle having a cross-sectional area equivalent to a measured cross-sectional area of the voids 20 on the cross section.

In the present embodiment, an area ratio of the voids 20 contained in the internal electrode layer 12 at the outermost layers in the lamination direction is larger than that in the central portion of the internal electrode layers 12 in the lamination direction. For example, Vc/Ve is preferably smaller than 1 (more preferably, 0.2 to 0.8), where Vc is an area ratio of the voids 20 with respect to an area of the internal electrode layers 12 at the central portion in the lamination direction, and Ve is an area ratio of the voids 20 with respect to an area of the internal electrode layer 12 at the outermost layers in the lamination direction.

In this structure, insulation properties are easily recovered after the short-circuit. This is probably because heat is not easily dispersed outward from the element body 4 if the voids contained in the internal electrode layers 12 at the outermost layers in the lamination direction have a large area ratio.

In the present embodiment, it is particularly preferred that an amount of boron (Bs) contained in the dielectric layers 10 located near the outer surface of the element body 4 shown in FIG. 1 is preferably smaller than an amount of boron (Bc) contained in the dielectric layers 10 located at the central portion of the element body 4.

In this structure, a deflection strength or a crack strength of the multilayer ceramic capacitor 2 is improved because, among others, a joint strength between the terminal electrodes 6 and 8 and the element body 4 is improved, and defects such as lowering of the strength of the outer surface due to a reaction of boron contained in the outer surface with moisture in the air are likely to be reduced.

Preferably, the content ratio Bs/Bc is 0.5 to 0.95. To adequately control the content ratio Bs/Bc, controlled are a debinding time, a firing time, an annealing time, etc. of the element body 4. The longer these times are, the smaller the content ratio Bs/Bc tends to be.

Method of Manufacturing Multilayer Ceramic Capacitor

Next, a method of manufacturing the multilayer ceramic capacitor 2 is described as an embodiment of the present invention.

A paste for inner green sheets and a paste for outer green sheets are initially prepared so as to manufacture inner green sheets, which will constitute the inner dielectric layers 10 shown in FIG. 1 after firing, and outer green sheets, which will constitute outer dielectric layers of the exterior regions.

The paste for inner green sheets and the paste for outer green sheets are normally made of an aqueous paste or an organic-solvent-based paste obtained by kneading a ceramic powder with an organic vehicle.

A raw material of the ceramic powder may be selected as appropriate from various compounds such as composite oxide and an oxide, for example, from a carbonate, a nitrate, a hydroxide, an organometallic compound and the like, which constitutes the above-described dielectric layers 10, and these various compounds can be mixed for use. In the present embodiment, the raw material of the ceramic powder used is preferably a powder having an average grain size of about 0.01 to 1 um. To obtain an extremely thin inner green sheet, preferably used is a powder that is finer than the thickness of the green sheet.

The organic vehicle is an organic solvent in which a binder is dissolved. The binder used for the organic vehicle may be any binder and be selected appropriately from normally used various binders, such as acrylic and ethyl cellulose.

The organic solvent to be used may be any solvent and be selected from various organic solvents, such as terpineol, butyl carbitol, alcohol, methyl ethyl ketone, acetone, and toluene, depending on the method to be used (e.g., printing method and sheet method).

If necessary, the paste for green sheets may be added with an additive selected from various dispersants, plasticizes, dielectrics, sub-component chemical compound, glass frit, insulators, and the like.

Examples of the plasticizer include phthalic acid esters (e.g., dioctyl phthalate and benzylbutyl phthalate), adipic acid, phosphoric esters, and glycols.

Subsequently prepared is a paste for internal electrode pattern layers for forming the internal electrode layers 12 shown in FIG. 1. The paste for internal electrode pattern layers is prepared by kneading the above-described organic vehicle with conductive materials made of the above-described various conductive metals or alloys. Instead of the conductive materials, oxides, organic metal compounds, resinate, or the like may be used. The above-mentioned oxides, organic metal compounds, and resinate will be the above-mentioned conductive material after firing. If necessary, the paste for internal electrode pattern layers may contain an inhibitor of ceramic powder (e.g., barium titanate powder). The inhibitor prevents the conductive powder from being sintered in the firing step.

Using the paste for inner green sheets and the paste for internal electrode pattern layers prepared in the above-described step, the inner green sheets serving as the inner dielectric layers 10 after firing and the internal electrode pattern layers serving as the internal electrode layers 12 after firing are laminated alternately to manufacture an internal multilayer body serving as the interior region after firing as shown in FIG. 1. After or before the internal multilayer body is manufactured, outer green sheets serving as the outer dielectric layers in the exterior regions after firing is formed using the paste for outer green sheets.

Specifically, the inner green sheets are formed on carrier sheets (e.g. PET film) as a support by a doctor blade method or so. The inner green sheets are dried after having been formed on the carrier sheets.

Next, the internal electrode pattern layers are formed on the surface of the inner green sheets formed in the above step using the paste for internal electrode pattern layers, and inner green sheets having the internal electrode pattern layers are obtained. Then, the obtained inner green sheets each having the internal electrode pattern layer are laminated alternately to obtain the internal multilayer body. The internal electrode pattern layers are formed by any method, such as printing method and transfer method. The inner green sheets each having the internal electrode pattern layers may be laminated via adhesive layers.

The outer green sheets are formed on the carrier sheets as a support in the same manner as the inner green sheets. The outer green sheets are formed on the carrier sheets and are thereafter dried. Incidentally, the outer green sheets are sufficiently thicker than the inner green sheets.

Instead of laminating the internal multilayer body on the outer green sheets, the inner green sheets and the internal electrode pattern layers may alternately be laminated directly on the outer green sheets by a predetermined number of layers. Alternatively, multilayer body units formed by alternately laminating a plurality of inner green sheets and a plurality of internal electrode pattern layers may be prepared in advance and laminated on the outer green sheets by a predetermined number of layers.

The obtained green multilayer body is cut to a predetermined size along cutting lines, for example, to form green chips. The green chips are solidified and dried for removal of plasticizer and are thereby solidified. The solidified and dried green chips are loaded into a barrel container together with media and polishing liquid and are subjected to barrel polishing by a horizontal centrifugal barrel machine. The green chips after having been subjected to the barrel polishing are washed with water and dried.

The dried green chips are debindered, fired, and if necessary, annealed, and the capacitor element body 4 shown in FIG. 1 is thereby obtained. When the internal electrode pattern layers serving as the internal electrode layers 12 contain copper, the temperature for firing is preferably lower than 1085° C. (melting point of copper), that is, a temperature of 900° C. to 1080° C. is preferable. When the internal electrode pattern layers serving as the internal electrode layers 12 contains silver, the temperature for firing is preferably lower than 962° C. (melting point of silver), that is, a temperature of 800° C. to 960° C. is preferable.

The sintered body (element body 4) thus obtained is subjected to edge polishing by barrel polishing or so, and the terminal electrodes 6 and 8 are formed by baking the paste for terminal electrodes. If necessary, a pad layer is formed on the terminal electrodes 6 and 8 by plating or so. The paste for terminal electrode layers is prepared in the same manner as the above-described paste for internal electrode pattern layers.

The multilayer ceramic capacitor 2 manufactured in this manner is mounted on a print board or so by soldering, conductive adhesive, or the like and is used for various electronic devices or so.

In the present embodiment, the coverage ratio of the internal electrode layers 12 can be controlled by adjusting an inhibitor amount and a binder amount in the paste for internal electrode pattern layers, an adhesion amount of the paste at the time of formation of the internal electrode pattern layers, a debinding temperature, a debinding treatment time, a firing temperature, a firing time, a firing atmosphere, etc., etc.

When the paste for internal electrode pattern layers has a large content ratio of inhibitor particles, the conductive powder is prevented from being sintered in the firing step, and the internal electrode layers 12 tend to have a small coverage ratio. Preferably, the ceramic powder (inhibitor) has an average particle size of 0.01 to 5 μm.

When the paste for internal electrode pattern layers has a large content ratio of a binder, the binder is resolved, turned into a gas, and desorbed in the debinder step and the firing step, which generates voids, and the internal electrode layers 12 thereby tend to have a small coverage ratio. Preferably, a content ratio of the binder in the paste for internal electrode pattern layers is 1 to 10 wt % with respect to 100 wt % of the conductive metal.

Adjusting the debindering temperature and the debindering treatment time into a predetermined range changes the degree of voids formed when the binder is resolved, turned into a gas, and desorbed and controls a coverage ratio of the internal electrode layers 12 into a predetermined range.

Adjusting the firing temperature, the firing time, and the firing atmosphere into a predetermined range changes the degree of sintering of the capacitor element body and controls a coverage ratio of the internal electrode layers 12 into a predetermined range.

On the other hand, the number of electrode-absent areas 12b can be controlled by adjusting a particle size of a conductive material composed of various conductive metals or alloys in the paste for internal electrode pattern layers, an amount of an inhibitor, an average particle size of a ceramic powder used as the inhibitor, a content ratio of a binder, a debindering temperature, a debindering treatment time, a firing temperature, a firing time, a firing atmosphere, etc.

When the conductive material composed of various conductive metals or alloys in the paste for internal electrode pattern layers has a large particle size, the electrodes are prevented from congregating each other and being combined in the firing step, and the number of electrode-absent areas 12b tends to increase. Preferably, the conductive material composed of various conductive metals or alloys has an average particle size of 0.2 to 3 μm.

As with the coverage ratio, the increase in content ratio of inhibitor particles tends to increase the number of electrode-absent areas 12b, and the number of electrode-absent areas can be controlled by content ratio of inhibitor particles. The number of electrode-absent areas, however, also changes by an average particle size of a ceramic powder used as an inhibitor and a thickness of the internal electrode layer. That is, when the inhibitor powder has an average particle size that is larger than a thickness of the internal electrode layer, the number of electrode-absent areas is large. Preferably, a ratio (D/T) of an average particle size (D) of an inhibitor powder to a thickness (T) of an internal electrode layer is 0.5 to 10.

As with the coverage ratio, when the paste for internal electrode pattern layers has a large content ratio of a binder, the binder is resolved, turned into a gas, and desorbed in the debinder step and the firing step, which generates voids, and the number of electrode-absent areas 12b thereby tends to increase.

Adjusting the debinder temperature and the debinder treatment time into a predetermined range changes the degree of voids formed when the binder is resolved, turned into a gas, and desorbed and controls the number of electrode-absent areas 12b into a predetermined range.

Adjusting the firing temperature, the firing time, and the firing atmosphere into a predetermined range controls the number of electrode-absent areas 12b. In particular, when the firing temperature is high or the firing time is long, the sintering of conductive powder is promoted, and the number of voids 20 increases.

The present invention is not limited to the above-described embodiment and may variously be modified within the scope of the present invention.

For example, the multilayer ceramic electronic component of the present invention is not limited to the multilayer ceramic capacitor, but may be applied to any other multilayer ceramic electronic components in which dielectric layers are laminated via internal electrodes, such as band-pass filters, multilayer three terminal filters, piezoelectric elements, PTC thermistors, NTC thermistors, and varistors.

EXAMPLES

The present invention is described based on further detailed examples, but the present invention is not limited to these examples.

Experimental Example 1

$BaTiO_3$ powders having a grain size of 0.05 to 1 μm were initially prepared as raw material powders of a main raw material. Then, $MgCO_3$, $MnCO_3$, $Y_2O_3$, $SiO_2$, and $B_2O_3$ were prepared as sub-components. Incidentally, the sub-components were preliminarily pulverized to have a grain size of about 0.03 to 0.2 which was smaller than a grain size of a raw material of barium titanate.

Next, each powder of the above-prepared sub-components was weighed so as to obtain 1.5 mol of the $MgCO_3$ powder, 0.2 mol of the $MnCO_3$ powder, 1.0 mol of the $Y_2O_3$ powder, and 10 mol of the $B_2O_3$ powder with respect to 100 mol of the main raw material. Each of these powders was wet-mixed and dried in a ball mill. Then, a dielectric raw material for the capacitance region was obtained. $MgCO_3$ and $MnCO_3$, both of which were added at this time, would be contained in the dielectric layers 10 as MgO and MnO, respectively, after firing.

100 parts by weight of the obtained dielectric raw materials, 7 parts by weight of acrylic resin, 4 parts by weight of butyl benzyl phthalate (BBP) as a plasticizer, 80 parts by weight of methyl ethyl ketone as a solvent were subsequently mixed in a ball mill and turned into a paste for inner dielectric layers.

Separately from the above, 56 parts by weight of Cu particles, 40 parts by weight of terpineol, 4 parts by weight of ethyl cellulose, 1 part by weight of benzotriazole, and 50 parts by weight of barium titanate particles as inhibitors were kneaded in a triple roll mill and turned into a paste for internal electrode layers. The average particle size of the Cu particles was 1 μm. Incidentally, the average particle size of the barium titanate particles as inhibitors was 1 μm.

Moreover, a main raw material powder whose average grain size was the same as that of the dielectric particles in the capacitance region was prepared as the dielectric raw material of the exterior regions. The sub-components are wet-mixed and turned into a paste for dielectric layers in the exterior regions in a similar manner to the dielectric raw material of the capacitance region.

Then, green sheets were formed on a PET film using the paste for dielectric layers prepared in the above-mentioned step. Then, green sheets were formed on a PET film using a dielectric paste for forming exterior regions. The paste for internal electrodes was screen-printed, and green sheets for interior region were formed.

A plurality of green sheets for interior region having the internal electrode layers and green sheets for exterior regions was laminated and adhered by pressure, and a green multilayer body was obtained. Then, the green multilayer body was cut into a predetermined size to obtain green chips.

The obtained green chips were subsequently debindered, fired, and annealed with the following conditions, and multilayer ceramic fired bodies were thereby obtained.

In the debinder treatment, the temperature increase rate was 25° C./hour, the retaining temperature was 260° C., the retention time was 8 hours, and the atmosphere was air.

In the firing treatment, the temperature increase rate was 200° C./hour, the retaining temperature was 1000° C., and the retention time was 120 minutes. The cooling rate was 200° C./hour. The atmosphere gas was a humidified mixed gas of $N_2+H_2$, and the oxygen partial pressure was $10^{-9}$ MPa or less.

In the annealing treatment, the temperature increase rate was 200° C./hour, the retaining temperature was 1000° C., the retention time was 10 hours, the cooling rate was 200° C./hour, and the atmosphere gas was a humidified $N_2$ gas (oxygen partial pressure: $10^{-8}$ MPa or less).

A wetter was used to humidify the atmosphere gas during the firing and annealing.

The obtained multilayer ceramic fired bodies underwent a barrel polish and were thereafter applied with a Cu paste as an external electrode and baked in a reducing atmosphere. Then, obtained was a plurality of multilayer ceramic capacitor samples (hereinafter these may simply be referred to as "capacitor samples") according to Example 1. FIG. 2 shows a schematically enlarged cross-sectional view of a main part of the capacitor samples according to Example 1. Incidentally, each layer of the internal electrode layers after firing had a thickness of 1.5 μm on average, and the internal dielectric layers had a thickness of 15 μm on average. The number of laminated layers of the internal electrode layers and the dielectric layers was 10.

Examples 2 to 8

Except for changing a preparation amount of a ceramic powder to be added as an inhibitor among manufacture conditions of the capacitor samples according to Example 1, a plurality of capacitor samples according to Examples 2 to 8 was manufactured in a similar manner to Example 1.

Example 9

Except for weighing 10 mol of $Li_2O$ (sub-component) to 100 mol of a main component instead of 10 mol of $B_2O_3$ powder, a plurality of capacitor samples according to Example 9 was manufactured in a similar manner to Example 7.

Example 10

Except for using 56 parts by weight of Ag particles instead of 56 parts by weight of Cu particles, a plurality of capacitor samples according to Example 10 was manufactured in a similar manner to Example 7. Incidentally, when Ag particles were used for internal electrode layers, the retention temperature in the firing step and the annealing step was set to 900° C. in accordance with the melting point of Ag.

Comparative Example 1

Except that barium titanate particles as inhibitors were not contained, a plurality of capacitor samples according to Comparative Example 1 was manufactured in a similar manner to Example 1.

Comparative Example 2

Except for using 56 parts by weight of Ni particles instead of 56 parts by weight of Cu particles, a plurality of capacitor samples according to Comparative Example 2 was manufactured in a similar manner to Example 7.

Comparative Example 3

A plurality of capacitor samples according to Comparative Example 3 was manufactured without containing either boron oxide or lithium oxide as a sub-component with respect to a main raw material of 100 mol.

Measurement

The following measurement was carried out for the capacitor samples obtained in Comparative Examples 1 to 3 and Examples 1 to 10. The results are shown in Table 1.

1. Coverage Ratio of Internal Electrodes

Each of Examples and Comparative Examples was polished on a perpendicular surface to the plane of the internal electrode layers of the multilayer ceramic capacitor samples. Then, the polished surface was enlarged and observed in nine visual views by a scanning electron microscope (SEM) at 3,000 times. An existence ratio (average) of electrode-present areas 12a in 10 internal electrode layers 12 per one visual view was calculated as a coverage ratio C (%) of internal electrodes.

Ideally, the internal electrode layers 12 should be continuous and have a predetermined length L. In fact, however, the internal electrodes are disconnected (electrode-absent areas 12b) in a plurality of spots by a so-called spheroidizing or so, and a total length ΣLi of the divided electrode-present areas 12a without the disconnected portions (electrode-absent areas 12b) is an actual length. Incidentally, when the internal electrode layers 12 were not disconnected at all, the coverage ratio of internal electrodes was 100%.

2. Initial Capacitance

Each of 10 capacitor samples of Examples and Comparative Examples before insulation restoration test was measured for capacitance by an LCR meter with 1 kHz and 1 Vrms, and an average of capacitance of the samples was calculated. An initial capacitance of Comparative Example 1 (standard sample) was considered to be 100%, and calculated was an average of capacitance of samples in each of Examples 1 to 10 (including Comparative Examples 2 and 3).

3. Insulation Restoration Properties (Self-Repairing Properties) Test

A plurality of capacitor samples in each of Examples and Comparative Examples was prepared and applied with voltage (1000V) to forcibly generate the short-circuit of the internal electrodes and achieve 10Ω or less. These 10 samples were prepared in each of Examples and Comparative Examples and applied with an electric current (2.5 A), and the number of samples whose insulation was restored to 10 kΩ or higher was examined. In the item of the insulation restoration in Table 1, the denominator of the numerical value is the number of samples tested, and the numerator is the number of samples whose insulation was restored.

Evaluation 1

Table 1 shows an evaluation result of a relation between coverage ratio of internal electrodes and insulation restoration properties with respect to the capacitor samples in each of Examples and Comparative Examples.

As shown in Comparative Example 2 of Table 1, the number of samples capable of insulation restoration was zero in electrodes containing Ni as internal electrode layers. In Comparative Example 3 (dielectric layers did not contain boron oxide or lithium oxide), the number of samples capable of insulation restoration was zero. In Comparative Example 1 (coverage ratio of internal electrode layers was 100%), the number of samples capable of insulation restoration was zero.

In contrast to Comparative Examples 1 to 3, it was also confirmed that the number of samples capable of insulation restoration was large (insulation restoration properties were excellent) in Examples 1 to 10 (the internal electrodes had a coverage ratio of 98% or less, the internal electrodes contained a main component of copper or silver, and the dielectric layers contained an oxide of boron or lithium).

Comparing Examples 1 to 10, it was confirmed that when the internal electrodes had a coverage ratio of 60 to 90%, insulation restoration properties were excellent, and initial capacitance was also high. In particular, it was confirmed that the internal electrode layers preferably contained copper (Cu) and the dielectric layers preferably contained boron (B).

It was confirmed that the coverage ratio of internal electrodes was controlled by content ratio of inhibitor particles contained in the internal electrode layers. More specifically, when a content ratio of inhibitor particles contained in the internal electrode layers was too large, the coverage ratio tended to decrease.

TABLE 1

|  | Internal Electrode Layers | Dielectric Layers | Amount of Inhibitor (parts by weight) | Coverage Ratio (%) | Initial Capacitance | Insulation Restoration |
|---|---|---|---|---|---|---|
| Ex. 1 | Cu | B2O3 | 50 | 50 | 40% | 10/10 |
| Ex. 2 | Cu | B2O3 | 40 | 60 | 90% | 10/10 |
| Ex. 3 | Cu | B2O3 | 30 | 70 | 93% | 10/10 |
| Ex. 4 | Cu | B2O3 | 20 | 80 | 95% | 10/10 |
| Ex. 5 | Cu | B2O3 | 10 | 90 | 98% | 10/10 |
| Ex. 6 | Cu | B2O3 | 8 | 92 | 98% | 9/10 |
| Ex. 7 | Cu | B2O3 | 5 | 95 | 99% | 7/10 |
| Ex. 8 | Cu | B2O3 | 2 | 98 | 99% | 5/10 |
| Ex. 9 | Cu | Li2O | 5 | 95 | 99% | 7/10 |
| Ex. 10 | Ag | B2O3 | 5 | 95 | 99% | 7/10 |
| Comp. Ex. 1 | Cu | B2O3 | 0 | 100 | 100% | 0/10 |
| Comp. Ex. 2 | Ni | B2O3 | 5 | 95 | 99% | 0/10 |
| Comp. Ex. 3 | Cu | None | 5 | 95 | 80% | 0/10 |

Experimental Example 2

A plurality of capacitor samples according to Example 11 was manufactured in a similar manner to Example 1. In Example 11, a barium titanate whose average particle size was 1 μm was used as an inhibitor, and the content ratio of the barium titanate was set to 50 parts by weight. In Example 11, each layer of the internal electrode layers after firing had a thickness of 1.5 μm on average, and each layer of the internal dielectric layers after firing had a thickness of 10 μm on average.

Examples 12 to 15

Except for changing a preparation amount of a ceramic powder to be added as an inhibitor among manufacture conditions of the capacitor samples of Example 11, a plurality of capacitor samples according to Examples 12 to 15 was manufactured.

Example 16

Except for using 56 parts by weight of Ag particles instead of 56 parts by weight of Cu particles, a plurality of capacitor samples according to Example 16 was manufactured in a similar manner to Example 15.

Example 17

Except for weighing 10 mol of $Li_2O$ (sub-component) to 100 mol of a main component instead of 10 mol of $B_2O_3$ powder, a plurality of capacitor samples according to Example 17 was manufactured in a similar manner to Example 15.

Example 18

Except for weighing 5 mol of $Li_2O$ in addition to 5 mol of $B_2O_3$ powder as sub-components to 100 mol of a main component, a plurality of capacitor samples according to Example 18 was manufactured in a similar manner to Example 15.

Comparative Example 4

Except for changing a preparation amount of barium titanate particles as inhibitors among manufacture conditions of capacitor samples, a plurality of capacitor samples according to Comparative Example 4 was manufactured in a similar manner to Example 11.

Comparative Example 5

Except for using 56 parts by weight of Ni particles instead of 56 parts by weight of Cu particles, a plurality of capacitor samples according to Comparative Example 5 was manufactured in a similar manner to Example 15.

Comparative Example 6

A plurality of capacitor samples according to Comparative Example 6 was manufactured without containing boron oxide or lithium oxide as a sub-component to 100 mol of a main component.

Measurement

In addition to the measurement of initial capacitance and the insulation restoration test carried out in Experimental Example 1, the following measurement was carried out for the capacitor samples obtained in Comparative Examples 1 and 3 to 6 and Examples 11 to 18. The results are shown in Table 2.

4. Number of electrode-absent areas in X0=50

As with the measurement of coverage ratio, each of Examples and Comparative Examples was polished on a perpendicular surface to the plane of the internal electrode layers of the multilayer ceramic capacitor samples. Then, the polished surface was enlarged and observed in nine visual views by a scanning electron microscope (SEM) at 3,000 times. 10 internal electrode layers 12 were observed per one visual view. In the internal electrode layers 12, obtained was an average of the number of electrode-absent areas 12b in a predetermined length X0 (=50 μm) along the longitudinal direction of the internal electrode layers 12. Incidentally, when the internal electrode layers 12 were not disconnected at all, the number of electrode-absent areas 12b in the internal electrode layers 12 was zero.

Evaluation 2

Table 2 shows an evaluation result of a relation between number of electrode-absent areas and insulation restoration properties with respect to the capacitor samples of each of Examples and Comparative Examples.

As shown in Comparative Example 5 of Table 2, the number of samples capable of insulation restoration was zero in electrodes containing Ni as internal electrode layers. In Comparative Example 6 (dielectric layers did not contain boron oxide or lithium oxide), the number of samples capable of insulation restoration was zero. In Comparative Example 4 (the number of electrode-absent areas in the internal electrode layers was one), the number of samples capable of insulation restoration was zero.

In contrast to Comparative Examples 1 and 3 to 6, it was also confirmed that the number of samples capable of insulation restoration was large (insulation restoration properties or self-repairing properties were excellent) in Examples (the number of electrode-absent areas in the internal electrode layers was two or more, the internal electrodes contained a main component of copper or silver, and the dielectric layers contained an oxide of boron or lithium).

Comparing Examples 11 to 18, it was confirmed that when the number of electrode-absent areas in the internal electrode layers was two to five, insulation restoration properties were particularly excellent, and initial capacitance was also high. In particular, it was confirmed that the internal electrode layers preferably contained copper (Cu) and the dielectric layers preferably contained boron (B).

It was confirmed that the number of electrode-absent areas in the internal electrode layers was controlled by content ratio of inhibitor particles. More specifically, when a content ratio of inhibitor particles contained in the internal electrode layers was too large, the number of electrode-absent areas tended to increase.

DESCRIPTION OF THE REFERENCE NUMERAL

2 . . . multilayer ceramic capacitor
4 . . . capacitor element body
6 . . . first terminal electrode
8 . . . second terminal electrode
10 . . . inner dielectric layer
10a . . . dielectric particle
12 . . . internal electrode layer
12a . . . electrode-present area
12b . . . electrode-absent area
20 . . . void

What is claimed is:

1. A multilayer ceramic electronic component comprising a ceramic element body including:
   a capacitance region formed by alternately laminating dielectric layers and internal electrode layers and encompassing only the overlapping area of the internal electrode layers, each of the dielectric layers being sandwiched between the internal electrode layers having different polarities; and
   an exterior region laminated outside the capacitance region in a laminating direction and formed by outer dielectric layers, wherein
   the dielectric layers include a main component containing barium titanate and a predetermined sub-component containing boron oxide and/or lithium oxide,
   an amount of the predetermined sub-component in terms of oxides is 2.5 to 20 mol parts with respect to 100 mol parts of the main component, in the dielectric layers,
   the internal electrode layers include a main component of copper and/or silver,
   a coverage ratio of the internal electrode layers to the dielectric layers is 98% or less,
   the coverage ratio of the internal electrode layers at outermost layers in a lamination direction of the capaci-

TABLE 2

| | Internal Electrode Layers | Dielectric Layers | Amount of Inhibitor (parts by weight) | Number of electrode-absent areas in 50 μm | Initial Capacitance | Insulation Restoration |
|---|---|---|---|---|---|---|
| Ex. 11 | Cu | B2O3 | 50 | 10 | 40% | 10/10 |
| Ex. 12 | Cu | B2O3 | 25 | 5 | 94% | 10/10 |
| Ex. 13 | Cu | B2O3 | 20 | 4 | 95% | 10/10 |
| Ex. 14 | Cu | B2O3 | 15 | 3 | 97% | 10/10 |
| Ex. 15 | Cu | B2O3 | 10 | 2 | 98% | 10/10 |
| Ex. 16 | Ag | B2O3 | 10 | 2 | 98% | 10/10 |
| Ex. 17 | Cu | Li2O | 10 | 2 | 98% | 10/10 |
| Ex. 18 | Cu | Li2O + B2O3 | 10 | 2 | 98% | 10/10 |
| Comp. Ex. 1 | Cu | B2O3 | 0 | 0 | 100% | 0/10 |
| Comp. Ex. 4 | Cu | B2O3 | 1.5 | 1 | 100% | 0/10 |
| Comp. Ex. 5 | Ni | B2O3 | 10 | 2 | 98% | 0/10 |
| Comp. Ex. 6 | Cu | None | 10 | 2 | 78% | 0/10 |

Apart from Experimental Examples 1 and 2, a plurality of capacitor samples where the internal dielectric layers 10 and the internal electrode layers 12 had a different thickness was manufactured and evaluated in terms of insulation restoration properties. As a result, even if the thickness of the internal dielectric layers 10 was changed in a range of 0.5 to 20 μm, insulation restoration properties were excellent as with Examples 1 to 18. It was also confirmed that even if the thickness of the internal electrode layers 12 was changed, insulation restoration properties were excellent as with Examples 1 to 18.

tance region is smaller than that at a central portion of the capacitance region in the lamination direction, and an amount of boron contained in dielectric layers at the outermost layers in the lamination direction of the capacitance region is smaller than that at the central portion in the lamination direction.

2. The multilayer ceramic electronic component according to claim 1, wherein the coverage ratio of the internal electrode layers is 60% or more and 90% or less.

3. The multilayer ceramic electronic component according to claim 1, wherein the internal electrode layers contain dielectric particles whose main component is barium titanate.

4. The multilayer ceramic electronic component according to claim 1, wherein the internal electrode layers contain voids.

5. The multilayer ceramic electronic component according to claim 4, wherein an area ratio of the voids contained in the internal electrode layers at outermost layers in a lamination direction of the internal electrode layers is larger than that at a central portion in the lamination direction.

6. The multilayer ceramic electronic component according to claim 1, wherein
Ce/Cc is 0.8 to 0.98, where Ce is the coverage ratio of the internal electrode layers at the outermost layers in the lamination direction, and Cc is the coverage ratio of the internal electrode layers at the central portion in the lamination direction.

7. The multilayer ceramic electronic component according to claim 4, wherein the voids have a cross-section-converted diameter of 0.2 µm to 3 µm.

8. A multilayer ceramic electronic component comprising a ceramic element body including:
a capacitance region formed by alternately laminating dielectric layers and internal electrode layers, each of the dielectric layers being sandwiched between the internal electrode layers having different polarities; and
an exterior region laminated outside the capacitance region in a laminating direction and formed by outer dielectric layers, wherein
the dielectric layers include a main component containing barium titanate and a sub-component containing boron oxide and/or lithium oxide,
the internal electrode layers include a main component of copper and/or silver,
the internal electrode layers include an electrode-present area, containing conductive particles forming the internal electrode layers, and two to five electrode-absent areas, failing to contain the conductive particles, arranged alternately in a predetermined length along a longitudinal direction of the internal electrode layers,
the predetermined length is 50 µm, and
the number of electrode-absent areas in the internal electrode layers at outermost layers in a lamination direction of the capacitance region in the predetermined length along the longitudinal direction is larger than that at a central portion in the lamination direction of the capacitance region in the predetermined length along the longitudinal direction.

9. The multilayer ceramic electronic component according to claim 8, wherein the internal electrode layers contain dielectric particles whose main component is barium titanate.

10. The multilayer ceramic electronic component according to claim 8, wherein the internal electrode layers contain voids.

11. The multilayer ceramic electronic component according to claim 10, wherein an area ratio of the voids contained in the internal electrode layers at outermost layers in a lamination direction of the internal electrode layers is larger than that at a central portion in the lamination direction.

12. The multilayer ceramic electronic component according to claim 8, wherein
Ec/Ee is 0.2 to 0.8, where Ec is the number of electrode-absent areas in the internal electrode layers at the central portion of the lamination direction, and Ee is the number of electrode-absent areas in the internal electrode layers at the outermost layers in the lamination direction.

13. The multilayer ceramic electronic component according to claim 10, wherein the voids have a cross-section-converted diameter of 0.2 µm to 3 µm.

14. The multilayer ceramic electronic component according to claim 8, wherein an amount of boron contained in dielectric layers at the outermost layers in the lamination direction of the capacitance region is smaller than that at the central portion in the lamination direction.

* * * * *